United States Patent
Hoerold et al.

(10) Patent No.: US 9,068,061 B2
(45) Date of Patent: Jun. 30, 2015

(54) FLAMEPROOF AGENT STABILISER COMBINATION FOR THERMOPLASTIC AND DUROPLASTIC POLYMERS

(75) Inventors: Sebastian Hoerold, Diedorf (DE); Harald Bauer, Kerpen (DE); Michael Hill, Hamburg (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 13/643,784

(22) PCT Filed: Apr. 20, 2011

(86) PCT No.: PCT/EP2011/002017
§ 371 (c)(1),
(2), (4) Date: Nov. 13, 2012

(87) PCT Pub. No.: WO2011/134623
PCT Pub. Date: Nov. 3, 2011

(65) Prior Publication Data
US 2013/0210975 A1 Aug. 15, 2013

(30) Foreign Application Priority Data
Apr. 29, 2010 (DE) .......................... 10 2010 018 680

(51) Int. Cl.
C08K 13/02 (2006.01)
C08K 5/5313 (2006.01)
C09K 21/12 (2006.01)
C08K 3/00 (2006.01)

(52) U.S. Cl.
CPC ............. *C08K 13/02* (2013.01); *C08K 3/0058* (2013.01); *C08K 5/5313* (2013.01); *C09K 21/12* (2013.01); *C08K 2201/014* (2013.01)

(58) Field of Classification Search
USPC ................................. 524/126; 106/419, 462
See application file for complete search history.

(56) References Cited

U.S. PATENT DOCUMENTS

| | | | |
|---|---|---|---|
| 3,900,444 | A | 8/1975 | Racky et al. |
| 4,036,811 | A | 7/1977 | Noetzel et al. |
| 5,780,534 | A | 7/1998 | Kleiner et al. |
| 6,013,707 | A | 1/2000 | Kleiner et al. |
| 6,121,445 | A | 9/2000 | Suzuki et al. |
| 6,136,973 | A | 10/2000 | Suzuki et al. |
| 6,207,736 | B1 | 3/2001 | Nass et al. |
| 6,255,371 | B1 | 7/2001 | Schlosser et al. |
| 6,365,071 | B1 | 4/2002 | Jenewein et al. |
| 6,503,969 | B1 | 1/2003 | Klatt et al. |
| 6,509,401 | B1 | 1/2003 | Jenewein et al. |
| 7,049,463 | B2* | 5/2006 | Wo et al. .................. 562/8 |
| 7,572,931 | B2* | 8/2009 | Liu et al. .................. 562/9 |
| 8,003,722 | B2* | 8/2011 | Levchik et al. ............ 524/126 |
| 2005/0137418 | A1 | 6/2005 | Bauer et al. |
| 2006/0074157 | A1 | 4/2006 | Bauer et al. |
| 2006/0089435 | A1* | 4/2006 | Hoerold et al. ............ 524/115 |
| 2010/0076132 | A1 | 3/2010 | Levchik et al. |
| 2011/0021676 | A1 | 1/2011 | Hoerold et al. |
| 2013/0126805 | A1 | 5/2013 | Hill et al. |
| 2013/0131235 | A1 | 5/2013 | Hoerold et al. |
| 2013/0131239 | A1 | 5/2013 | Hill et al. |

FOREIGN PATENT DOCUMENTS

| | | |
|---|---|---|
| DE | 2252258 | 5/1974 |
| DE | 2447727 | 4/1976 |

(Continued)

OTHER PUBLICATIONS

PCT International Search report for PCTT/EP2011/002107, Sep. 15, 2011.
English translation of the PCT International Preliminary Report on Patentability for PCT/EP2011/002107, Oct. 30, 2012.
English Abstract for DE 19920279, Nov. 9, 2000.
H. Zweifel (ed.); "Plastics Additives Handbook" 5th edition, Carl Hauser Verlag, Munich, pp. 80-84, 2000.
United States Patent & Trademark Office Office Action for U.S. Appl. No. 13/643,810, mailed Mar. 5, 2014.
United States Patent & Trademark Office Office Action for U.S. Appl. No. 13/643,899, mailed Oct. 8, 2013.

(Continued)

*Primary Examiner* — Robert D. Harlan
(74) *Attorney, Agent, or Firm* — Anthony A. Bisulca

(57) ABSTRACT

The invention relates to a novel flameproof agent stabiliser combination for thermoplastic and duroplastic polymers, containing, as component A 25-97.7 wt % of a dialkylphosphinic acid salt of formula (I) and/or a diphosphinic acid salt of formula (II) and/or polymers thereof, wherein $R^1$, $R^2$ are the same or different and represent $C_1$-$C_6$-alkyl, linear or branched and/or aryl; $R^3$ represents $C_1$-$C_{10}$-alkylene, linear or branched, $C_6$-$C_{10}$-arylene, $C_7$-$C_{20}$-alkylarylene or $C_7$-$C_{20}$-arylalkylene; M represents Mg, Ca, Al, Sb, Sn, Ge, Ti, Zn, Fe, Zr, Ce, Bi, Sr, Mn, Li, Na, K and/or a protonated nitrogen base; m represents 1-4; n represents 1-4; x represents 1-4, as component B 2-45 wt. % of a monoalkylphosphinic acid salt of general formula (III), wherein $R^4$ represents $C_1$-$C_6$-alkyl, linear or branched; M represents Mg, Ca, Al, Sb, Sn, Ge, Ti, Zn, Fe, Zr, Ce, Bi, Sr, Mn, Li, Na, K and/or a protonated nitrogen base; representing, as component C 0.3-30 wt. % of a synergist containing nitrogen or a phosphorous/nitrogen flameproof agent and as component D 0-10 wt. % of a zinc salt or a basic or amphoteric oxide, hydroxide, carbonate, silicate, borate, stannate, mixed oxide-hydroxides, oxide-hydroxide-carbonate, hydroxide-silicates or hydroxide-borates or mixtures of said substances, as components E 0-3 wt. % phosphonite or a phosphonite/phosphite mixture and as component F 0-3 wt.% of an ester or salt of long-chained carboxylic acids, the total of the components always amounting to 100 wt. %.

16 Claims, No Drawings

(56) References Cited

FOREIGN PATENT DOCUMENTS

| | | |
|---|---|---|
| DE | 19737727 | 7/1999 |
| DE | 19820398 | 11/1999 |
| DE | 19614424 | 11/2000 |
| DE | 19920276 | 11/2000 |
| DE | 19734437 | 2/2001 |
| DE | 19933901 | 2/2001 |
| DE | 10241126 | 3/2004 |
| EP | 0699708 | 3/1996 |
| WO | WO 96/16948 | 6/1996 |
| WO | PCT/EP97/01664 | 10/1997 |
| WO | WO 98/39306 | 9/1998 |
| WO | PCT/US2006/045770 | 9/2008 |
| WO | WO 2009/109316 | 9/2009 |

OTHER PUBLICATIONS

United States Patent & Trademark Office Office Action for U.S. Appl. No. 13/643,899, mailed Apr. 17, 2014.

* cited by examiner

FLAMEPROOF AGENT STABILISER COMBINATION FOR THERMOPLASTIC AND DUROPLASTIC POLYMERS

The invention relates to a flame retardant-stabilizer combination for thermoplastic and thermoset polymers and to polymeric molding compositions and moldings which comprise such flame retardant-stabilizer combinations.

Thermoplastic polymers are processed predominantly in the melt. Barely any polymer withstands the associated changes in structure and state without any change in its chemical structure. Crosslinking, oxidation, changes in molecular weight and hence also changes in the physical and technical properties may be the result. In order to reduce stress on the polymers during processing, different additives are added according to the polymer.

Different additives are often used at the same time, each of which takes on a particular task. For instance, antioxidants and stabilizers are used in order that the polymer withstands processing without chemical damage and then has a sufficient period of stability with respect to outside influences such as heat, UV light, weathering and oxygen (air). in addition to improving flow characteristics, lubricants prevent excessive adhesion of the polymer melt to hot machine parts and act as a dispersant for pigments, fillers and reinforcers.

The use of flame retardants can influence the stability of polymers in the course of processing in the melt. Flame retardants frequently have to be added in high dosages in order to ensure sufficient flame retardancy of the polymer according to international standards. Due to their chemical reactivity, which is required for flame retardancy at high temperatures, flame retardants can impair the processing stability of polymers. This may result, for example, in increased polymer degradation, crosslinking reactions, outgassing or discoloration.

Polyamides are stabilized, for example, by small amounts of copper halides and aromatic amines, and sterically hindered phenols, with emphasis on the achievement of long-term stability at high sustained use temperatures (H. Zweifel (ed.): "Plastics Additives Handbook", 5$^{th}$ Edition, Carl Hanser Verlag, Munich, 2000, pages 80 to 84).

Especially for thermoplastic polymers, the salts of phosphinic acids (phosphinates) have been found to be effective flame-retardant additives (DE-A-2 252 258 and DE-A-2 447 727). Calcium phosphinates and aluminum phosphinates have been described as particularly effective in polyesters and impair the material properties of the polymer molding compositions to a lesser degree than the alkali metal salts (EP-A-0 699 708). In addition, synergistic combinations of phosphinates with particular nitrogen-containing compounds have been found, and these have been found to be more effective as flame retardants in a whole series of polymers than the phosphinates alone (PCT/EP97/01664, and also DE-A-197 34 437 and DE-A-197 37 727).

It is likewise advantageously possible to render thermoset polymers flame-retardant with particular phosphinates.

Polymer molding compositions with phosphorus-containing flame retardants can be stabilized with carbodiimides, isocyanates and isocyanurates (DE-A-199 20 276).

Especially in the case of use of phosphorus-containing flame retardants in polyamides, the efficacy of the stabilizers described to date has been found to be inadequate, specifically for countering the effects which occur in the course of processing, such as discoloration and decreasing molecular weight.

DE-A-196 14 424 describes phosphinates in conjunction with nitrogen synergists in polyesters and polyamides. DE-A-199 33 901 describes phosphinates in combination with melamine polyphosphate as a flame retardant for polyesters and polyamides. In the case of use of these very effective flame retardants, however, there may be partial polymer degradation and discoloration of the polymer, especially at processing temperatures above 300° C.

US-A-2008/0132619 describes phosphinic salts which volatilize above 300° C. as effective flame retardant additives compared to less volatile phosphinic salts.

PCT/US2006/045770 describes flame-retardant thermoplastic polymers which comprise a mixture of metal salts of dialkylphosphinic acids and monoalkylphosphinic acids. The only examples given for the corresponding salts are those of isobutylphosphinic acid.

Disadvantages in the case of use of phosphinic salts of relatively high volatility are the formation of mold deposits in the course of injection molding and of exudation in the course of storage under moist and warm conditions, and the escape of emissions in the course of compounding.

It was therefore an object of the present invention to provide flame retardant combinations for polymers which, as well as flame retardancy, also exert a stabilizing effect on the polymer, do not lead to mold deposits and do not lead to exudation from the polymers.

This object is achieved by use of a mixture of a salt of a dialkylphosphinic acid (component A) with a salt of a monoalkylphosphinic acid (component B) and with nitrogen-containing synergists or a phosphorus-nitrogen flame retardant (component C).

In addition, the inventive mixture may comprise as component D (stabilizer) zinc salts, basic or amphoteric oxides, hydroxides, carbonates, silicates, borates, stannates, mixed oxide-hydroxides, oxide-hydroxide-carbonates, hydroxide-silicates or hydroxide-borates or/and mixtures of these substances, and as component E a phosphonite or a phosphonite/phosphite mixture, and as component F an ester or salt of long-chain aliphatic carboxylic acids (fatty acids) which typically have chain lengths of $C_{14}$ to $C_{40}$.

The invention therefore provides a flame retardant-stabilizer combination for thermoplastic and thermoset polymers, comprising as component A 25 to 97.7% by weight of a dialkylphosphinic salt of the formula (I) and/or of a diphosphinic salt of the formula (II) and/or polymers thereof

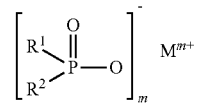

(I)

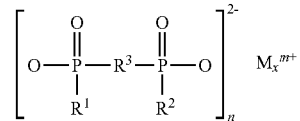

(II)

in which
R$^1$, R$^2$ are the same or different and are each linear or branched $C_1$-$C_6$-alkyl;
R$^3$ is linear or branched $C_1$-$C_{10}$-alkylene, $C_6$-$C_{10}$-arylene, $C_7$-$C_{20}$-alkylarylene or $C_7$-$C_{20}$-arylalkylene;
M is Mg, Ca, Al, Sb, Sn, Ge, Ti, Zn, Fe, Zr, Ce, Bi, Sr, Mn, Li, Na, K and/or a protonated nitrogen base;

m is 1 to 4;
n is 1 to 4;
x is 1 to 4,
as component B 2 to 45% by weight of a monoalkylphosphinic salt of the formula (III)

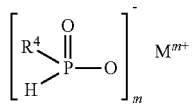

in which
R⁴ is linear or branched $C_1$-$C_6$-alkyl;
M is Mg, Ca, Al, Sb, Sn, Ge, Ti, Zn, Fe, Zr, Ce, Bi, Sr, Mn, Li, Na, K and/or a protonated nitrogen base,
as component C 0.3 to 30% by weight of a nitrogen-containing synergist or of a phosphorus/nitrogen flame retardant,
as component D 0 to 10% by weight of a zinc salt or of a basic or amphoteric oxide, hydroxide, carbonate, silicate, borate, stannate, mixed oxide-hydroxide, oxide-hydroxide-carbonate, hydroxide-silicate or hydroxide-borate or mixtures of these substances,
as component E 0 to 3% by weight of a phosphonite or of a mixture of a phosphonite and a phosphite, and as component F 0 to 3% by weight of an ester or salt of long-chain aliphatic carboxylic acids (fatty acids) which typically have chain lengths of $C_{14}$ to $C_{40}$, where the sum of the components is always 100% by weight.

It has been found that, surprisingly, inventive combinations of salts of dialkylphosphinic acids and nitrogen synergists, for example melamine polyphosphate, and stabilizers, for example zinc borate or boehmite, have distinctly improved stability on incorporation into polymers when particular salts of the monoalkylphosphinic acids are added. Polymer degradation is prevented or very greatly reduced and no mold deposits or exudation are observed. The inventive combinations additionally reduce the discoloration of the polymers in the course of processing in the melt and suppress the degradation of the polymers to units of lower molecular weight.

More preferably, $R^1$, $R^2$ are the same or different and are each methyl, ethyl, n-propyl, isopropyl, n-butyl, tert-butyl, n-pentyl.

Preferably, $R^3$ is methylene, ethylene, n-propylene, isopropylene, n-butylene, tert-butylene, n-pentylene, n-octylene or n-dodecylene; phenylene or naphthylene.

The inventive flame retardant-stabilizer combination preferably comprises
25 to 97.4% by weight of component A,
2 to 35% by weight of component B,
0.3 to 27% by weight of component C,
0.1 to 7% by weight of component D,
0.1 to 3% by weight of component E and
0.1 to 3% by weight of component F.

The inventive flame retardant-stabilizer combination more preferably comprises
50 to 69.7% by weight of component A,
10 to 15% by weight of component B,
20 to 25% by weight of component C,
0.1 to 5% by weight of component D,
0.1 to 3% by weight of component E and
0.1 to 2% by weight of component F.

Component C preferably comprises condensation products of melamine and/or reaction products of melamine with phosphoric acid and/or reaction products of condensation products of melamine with polyphosphoric acid or mixtures thereof.

Component C preferably comprises melam, melem, melon, dimelamine pyrophosphate, melamine polyphosphate, melam polyphosphate, melon polyphosphate and melem polyphosphate or mixed poly salts thereof.

The phosphorus/nitrogen flame retardants (component C) preferably also comprise nitrogen-containing phosphates of the formulae $(NH_4)_y H_{3-y} PO_4$ and $(NH_4 PO_3)_z$, where y is 1 to 3 and z is 1 to 10 000.

These are preferably ammonium hydrogenphosphate, ammonium dihydrogenphosphate and/or ammonium polyphosphate.

The nitrogen-containing synergists (component C) preferably also comprise benzoguanamine, tris(hydroxyethyl) isocyanurate, allantoin, glycoluril, melamine, melamine cyanurate, dicyandiamide and/or guanidine.

Component D preferably comprises magnesium oxide, calcium oxide, aluminum oxide, zinc oxide, manganese oxide, tin oxide, aluminum hydroxide, boehmite, dihydrotalcite, hydrocalumite, magnesium hydroxide, calcium hydroxide, zinc hydroxide, tin oxide hydrate, manganese hydroxide, zinc borate, basic zinc silicate and/or zinc stannate.

The phosphonites (component E) are preferably those of the structure

where
R is a mono- or polyvalent aliphatic, aromatic or heteroaromatic organic radical and
$R_1$ is a compound of the structure (V)

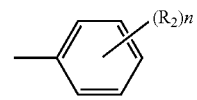

or the two $R_1$ radicals form a bridging group of tile structure (VI)

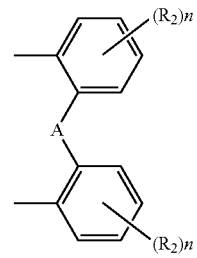

where
A is a direct bond, O, S, $C_{1-18}$-alkylene (linear or branched), $C_{1-18}$-alkylidene (linear or branched), in which
$R_2$ is independently $C_{1-12}$-alkyl (linear or branched), $C_{1-12}$-alkoxy, $C_{5-12}$-cycloalkyl and
n is 0 to 5 and
m is 1 to 4.

Component F preferably comprises alkali metal, alkaline earth metal, aluminum and/or zonc salts or long-chain fatty acids having 14 to 40 carbon atoms and/or reaction products of long-chain fatty acids having 14 to 40 carbon atoms with polyhydric alcohols such as ethylene glycol, glycerol, trimethylolpropane and/or pentaerythritol.

The invention also relates to a flame-retardant polymer molding composition comprising a flame retardant-stabilizer combination as claimed in one or more of claims 1 to 13, wherein the polymer comprises thermoplastic polymers of the HI (high-impact) polystyrene, polyphenylene ether, polyamide, polyester or polycarbonate type, and blends or polymer blends of the ABS (acrylonitrile-butadiene-styrene) or PC/ABS (polycarbonate/acrylonitrile-butadiene-styrene) or PPE/HIPS (polyphenylene ether/HI polystyrene) polymer type.

The flame-retardant polymer molding composition preferably comprises 50 to 98% by weight of polymer molding composition and 2 to 50% by weight of the flame retardant-stabilizer combination as claimed in one or more of claims 1 to 13.

Finally, the invention also relates to a polymer molding, film, filament or fiber comprising a flame retardant-stabilizer combination as claimed in one or more of claims 1 to 13, wherein the polymer comprises HI (high-impact) polystyrene, polyphenylene ethers, polyamides, polyesters, polycarbonates and blends or polymer blends of the ABS (acrylonitrile-butadiene-styrene) or PC/ABS (polycarbonate/acrylonitrile-butadiene-styrene), polyamide, polyester and/or ABS type, and which comprises 50 to 98% by weight of polymer molding, film, filament and/or fiber and 2 to 50% by weight of the flame retardant-stabilizer combination as claimed in one or more of claims 1 to 13.

M is preferably calcium, aluminum or zinc.

Protonated nitrogen bases are preferably understood to mean the protonated bases of ammonia, melamine and triethanolamine, especially $NH_4^+$.

Suitable phosphinates are described in PCT/WO97/39053, which is explicitly incorporated by reference.

Particularly preferred phosphinates are aluminum, calcium and zinc phosphinates.

The invention also includes synergistic combinations of the phosphinates mentioned with nitrogen-containing compounds (DE-A-196 14 424, DE-A-197 34 437 and DE-A-197 37 727).

The nitrogen-containing synergists are preferably those of the formulae (VII) to (XII) or mixtures thereof

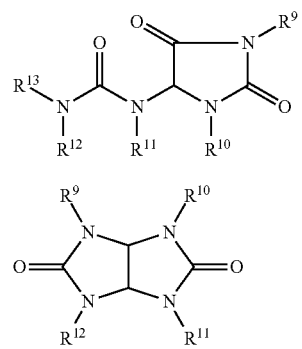

(VII)

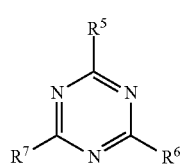

(VIII)

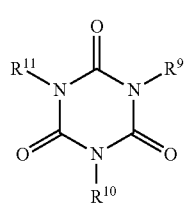

(IX)

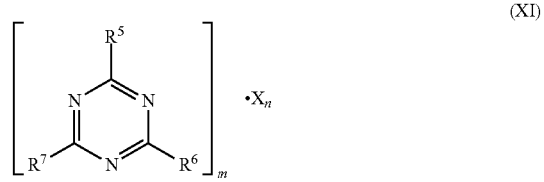

(X)

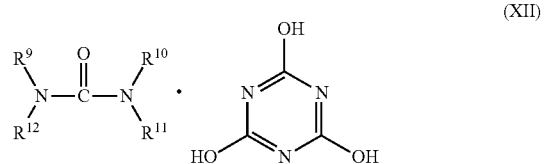

(XI)

(XII)

in which
$R^5$ to $R^7$ are each hydrogen, $C_1$-$C_8$alkyl, $C_5$-$C_{16}$-cycloalkyl or -alkylcycloalkyl, possibly substituted by a hydroxyl function or a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl, —$OR^8$ and —$N(R^8)R^9$, and also N-alicyclically or N-aromatically,
$R^8$ is hydrogen, $C_1$-$C_8$-alkyl, $C_5$-$C_{16}$-cycloalkyl or -alkylcycloalkyl, possibly substituted by a hydroxyl function or a $C_1$-$C_4$-hydroxyalkyl function, $C_2$-$C_8$-alkenyl, $C_1$-$C_8$-alkoxy, -acyl, -acyloxy or $C_6$-$C_{12}$-aryl or -arylalkyl,
$R^9$ to $R^{13}$ are the same groups as $R^8$, and also —O—$R^8$,
m and n are each independently 1, 2, 3 or 4,
X denotes acids which can form adducts with triazine compounds (III);
or oligomeric esters of tris(hydroxyethyl) isocyanurate with aromatic polycarboxylic acids.

Suitable synergists also include carbodiimides, zinc borate, condensation products of melamine (WO-A-96/16948), reaction products of melamine with phosphoric acid or condensed phosphoric acids, or reaction products of condensation products of melamine with phosphoric acid or condensed phosphoric acids, and mixtures of the products mentioned (WO-A-98/39306). A particularly suitable component C is melamine polyphosphate.

The invention also includes the following combinations of components A, B, C, D, E and F:
ABC, ABD, ABE, ABF,
ABCD, ABCE, ABCF, ABDE, ABDF, ABEF
ABCDE, ABCDF, ABCEF.

Additives may be added to the inventive combination of components A, B and C, and optionally D, E and F, for example antioxidants, UV absorbers, light stabilizers, metal deactivators, peroxide-destroying compounds, polyamide stabilizers, basic costabilizers, nucleating agents, fillers, reinforcers, further flame retardants and other additions.

Suitable antioxidants are, for example, alkylated monophenols, e.g. 2,6-di-tert-butyl-4-methylphenol; 1,2-alkylthiomethylphenols, e.g. 2,4-dioctylthiomethyl-6-tert-butylphenol; hydroquinones and alkylated hydroquinones, e.g. 2,6-di-tert-butyl-4-methoxyphenol; tocopherols, e.g. α-tocopherol, β-tocopherol, γ-tocopherol, δ-tocopherol and mixtures thereof (vitamin E); hydroxylated thiodiphenyl ethers, e.g. 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-di-methyl-4-hydroxyphenyl) disulfide; alkylidenebisphenols, e.g. 2,2'-methylenebis(6-tert-butyl-4-methylphenol); O-, N- and S-benzyl compounds, e.g. 3,5,3',5'-tetra-tert-butyl-4,4'-dihydroxydibenzyl ether; hydroxybenzylated malonates, e.g. dioctadecyl 2,2-bis(3,5-di-tert-butyl-2-hydroxybenzyl)malonate; hydroxybenzyl aromatics, e.g. 1,3,5-tris-(3,5-di-tert-butyl)-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris-(3,5-di-tert-butyl-4-hydroxybenzyl)phenol; triazine compounds, e.g. 2,4-bisoctylmercapto-6-(3,5-di-tert-butyl-4-hydroxyanilino)-1,3,5-triazine; benzyl phosphonates, e.g. dimethyl 2,5-di-tert-butyl-4-hydroxybenzylphosphonate; acylaminophenols, 4-hydroxylauramide, 4-hydroxystearanilide, N-(3,5-di-tert-butyl-4-hydroxyphenyl)carbamic acid octyl ester; esters of β-(3,5-di-tert-butyl-4-hydroxyphenyl)propionic acid with mono- or polyhydric alcohols; esters of β-(5-tert-butyl-4-hydroxy-3-methylphenyl)propionic acid with mono- or polyhydric alcohols; esters of β-(3,5-dicyclohexyl-4-hydroxyphenyl)propionic acid with mono- or polyhydric alcohols; esters of 3,5-di-tert-butyl-4-hydroxyphenylacetic acid with mono- or polyhydric alcohols; amides of β-(3,5-di-tert-butyl-4-hydroxyphenyl)propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

Suitable UV absorbers and light stabilizers are, for example, 2-(2'-hydroxyphenyl)benzotriazoles, for example 2-(2'-hydroxy-5'-methylphenyl)benzotriazole;

2-hydroxybenzophenones, for example the 4-hydroxy, 4-methoxy, 4-octoxy, 4-decyloxy, 4-dodecyloxy, 4-benzyloxy, 4,2',4-trihydroxy, 2'-hydroxy-4,4'-dimethoxy derivative;

esters of optionally substituted benzoic acids, for example 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate; acrylates, for example ethyl or isooctyi α-cyano-β,β-diphenylacrylate, methyl α-carbomethoxycinnamate, methyl or butyl α-cyano-β-methyl-p-methoxycinnamate, methyl α-carbomethoxy-p-methoxycinnamate, N-(β-carbomethoxy-β-cyanovinyl)-2-methylindoline.

In addition, nickel compounds, for example nickel complexes of 2,2'-thiobis-[4(1,1,3,3-tetramethylbutyl)phenol], such as the 1:1 or the 1:2 complex, optionally with additional ligands such as n-butylamine, triethanolamine or N-cyclohexyldiethanolamine, nickel dibutyldithiocarbamate, nickel salts of 4-hydroxy-3,5-di-tert-butylbenzylphosphonic acid monoalkyl esters, such as those of the methyl or ethyl ester, nickel complexes of ketoximes, such as those of 2-hydroxy-4-methylphenyl undecyl ketoxime, nickel complexes of 1-phenyl-4-lauroyl-5-hydroxy-pyrazole, optionally with additional ligands; sterically hindered amines, for example bis(2,2,6,6-tetramethylpiperidyl) sebacate; oxalamides, for example 4,4'-dioctyloxyoxanilide; 2-(2-hydroxyphenyl)-1,3,5-triazines, for example 2,4,6-tris(2-hydroxy-4-octyloxyphenyl)-1,3,5-triazine.

Suitable metal deactivators are, for example, N,N'-diphenyloxalamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalic dihydrazide, oxanilide, isophthalic dihydrazide, sebacic bisphenylhydrazide, N,N'-diacetyladipic dihydrazide, N,N'-bis(salicyloyl)oxalic dihydrazide, N,N'-bis(salicyloyl)thiopropionic dihydrazide.

Suitable peroxide-destroying compounds are, for example, esters of β-thiodipropionic acid, for example the lauryl, stearyl, myristyi or tridecyl esters, mercaptobenzimidazole, the zinc salt of 2-mercaptobenzimidazole, zinc dibutyldithiocarbamate, dioctadecyl disulfide, pentaerythrityl tetrakis(β-dodecylmercapto)propionate.

Suitable polyamide stabilizers are, for example, copper salts in combination with iodides and/or phosphorus compounds and salts of divalent manganese.

Suitable basic costabiiizers are melamine, polyvinylpyrrolidone, dicyandiamide, triallyl cyanurate, urea derivatives, hydrazine derivatives, amines, polyamides, polyurethanes, alkali metal and alkaline earth metal salts of higher fatty acids, for example calcium stearate, zinc stearate, magnesium behenate, magnesium stearate, sodium ricinoleate, potassium palmitate, antimony catecholate or tin catecholate.

Suitable nucleating agents are, for example, 4-tert-butylbenzoic acid, adipic acid and diphenylacetic acid.

Examples of fillers and reinforcers include calcium carbonate, silicates, glass fibers, asbestos, talc, kaolin, mica, barium sulfate, metal oxides and hydroxides, carbon black, graphite and others.

Suitable further flame retardants are, for example, aryl phosphates, phosphonates, salts of hypophosphorous acid and red phosphorus.

The other additions include, for example, plasticizers, expandable graphite, lubricants, emulsifiers, pigments, optical brighteners, flame retardants, antistats, blowing agents.

These additional additives can be added to the polymers before, together with or after addition of the flame retardants. These additives, and also the flame retardants, can be dosed in solid form, in a solution or melt, or else in the form of solid or liquid mixtures or as masterbatches/concentrates.

The metal oxides are preferably magnesium oxide, calcium oxide, aluminum oxide, zinc oxide, manganese oxide and/or tin oxide.

The hydroxides are preferably aluminum hydroxide, boehmite, magnesium hydroxide, hydrotalcite, hydrocalumite, calcium hydroxide, zinc hydroxide, tin oxide hydrate and/or manganese hydroxide.

Component D preferably comprises zinc borate, basic zinc silicate, zinc stannate, dihydrotalcite and/or boehmite.

In the case of the phosphonites, the radicals are preferably R is $C_{4-18}$-alkyl (linear or branched), $C_{4-18}$-alkylene (linear or branched), $C_{5-12}$-cycloalkyl, $C_{5-12}$-cycloalkylene, $C_{6-24}$-aryl or -heteroaryl, $C_{6-24}$-arylene or -heteroarylene, which may also have further substitution;

$R_1$ is a compound of the structure (V) or (VI) where $R_2$ is independently $C_{1-8}$-alkyl (linear or branched), $C_{1-8}$-alkoxy, cyclohexyl;

A is a direct bond, O, $C_{1-8}$-alkylene (linear or branched), $C_{1-8}$-alkylidene (linear or branched), and n is 0 to 3;

m is 1 to 3.

In the case of the phosphonites, the radicals are more preferably

From this group of compounds, preference is given in turn to the following structures (XIV) and (XV):

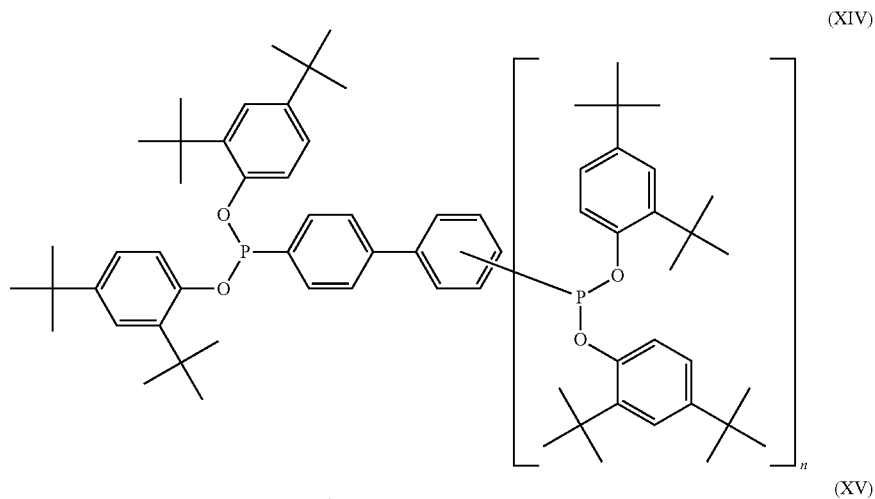

(XIV)

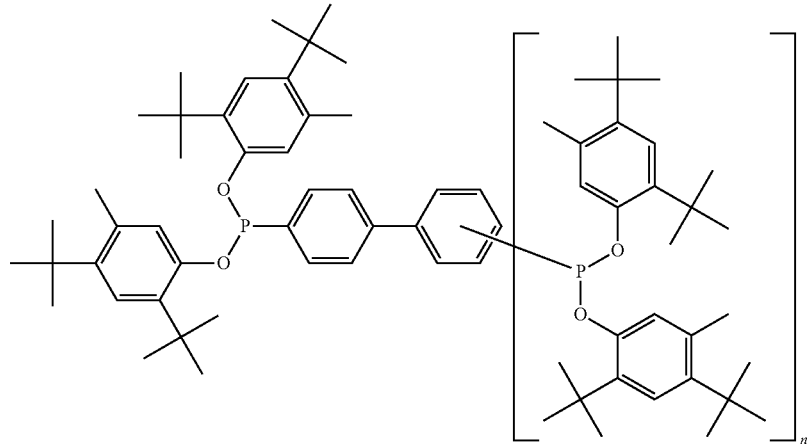

(XV)

R is cyclohexyl, phenyl, phenylene, biphenyl and biphenylene;
$R_1$ is a compound of the structure (V) or (VI) where
$R_2$ is independently $C_{1-8}$-alkyl (linear or branched), $C_{1-8}$-alkoxy, cyclohexyl;
A is a direct bond, O, $C_{1-6}$-alkylidene (linear or branched) and n is 1 to 3;
m is 1 or 2.

Additionally claimed are mixtures of compounds according to the above claims in combination with phosphites of the formula (XIII)

$P(OR_1)_3$ (XIII)

where $R_1$ is as defined above.

Especially preferred are compounds which, based on the above information, are prepared by a Friedel-Crafts reaction of an aromatic or heteroaromatic, such as benzene, biphenyl or diphenyl ether, with phosphorus trihalides, preferably phosphorus trichloride, in the presence of a Friedel-Crafts catalyst such as aluminum chloride, zinc chloride, iron chloride etc., and subsequent reaction with the phenols underlying the structures (V) and (VI). Also explicitly included are those mixtures with phosphites which form according to the reaction sequence mentioned from excess phosphorus trihalide and the above-described phenols.

where n may be 0 or 1 and these mixtures may optionally further comprise proportions of the compound (XVI) and/or (XVII):

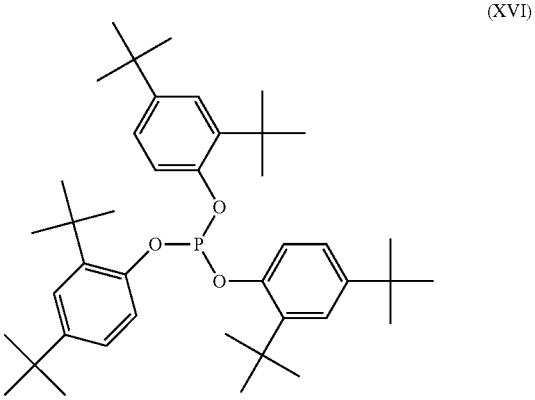

(XVI)

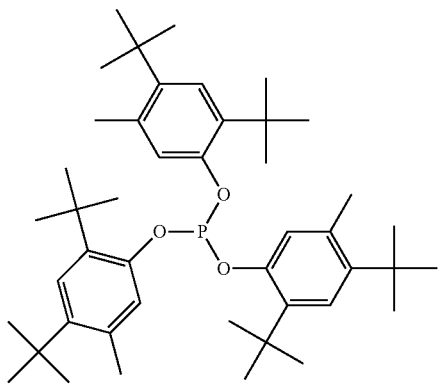

(XVII)

Suitable components F are esters or salts of long-chain aliphatic carboxylic acids (fatty acids) which typically have chain lengths of $C_{14}$ to $C_{40}$. The esters are reaction products of the carboxylic acids mentioned with standard polyhydric alcohols, for example ethylene glycol, glycerol, trimethylolpropane or pentaerythritol. Useful salts of the carboxylic acids mentioned are in particular alkali metal or alkaline earth metal salts or aluminum and zinc salts.

Preferred components F are esters or salts of stearic acid, for example glyceryl monostearate or calcium stearate.

Component F preferably comprises reaction products of montan wax acids with ethylene glycol.

The reaction products are preferably a mixture of ethylene glycol mono-montan wax ester, ethylene glycol di-montan wax ester, montan wax acids and ethylene glycol.

Component F preferably comprises reaction products of montan wax acids with a calcium salt.

The reaction products are more preferably a mixture of 1,3-butanediol mono-montan wax ester, 1,3-butanediol di-montan wax ester, montan wax acids, 1,3-butanediol, calcium montanate and the calcium salt.

The ratios of components A, B and C in the flame retardant-stabilizer combination depend essentially on the envisaged field of use and can vary within wide limits. According to the field of use, the flame retardant-stabilizer combination contains 50 to 94% by weight of component A, 3 to 25% by weight of component B and 3 to 25% by weight of component C. Components D, E and F are each independently added in 0 to 10% by weight or 0 to 3% by weight.

The flame retardant-stabilizer combination may also comprise 50 to 80% by weight of component A, 5 to 15% by weight of component B, 15 to 25% by weight of component C, 0 to 5% by weight of component D, 0 to 2% by weight of component E and 0 to 2% by weight of component F.

The flame retardant-stabilizer combination may optionally comprise 50 to 70% by weight of component A, 10 to 15% by weight of component B and 20 to 25% by weight of component C, 0 to 5% by weight of component D, 0 to 1% by weight of component E and 0 to 1% by weight of component F.

Other suitable combinations comprise 50 to 70% by weight of component A, 10 to 15% by weight of component B and 20 to 25% by weight of component C, 2 to 5% by weight of component D and 0 to 1% by weight of component E, 0 to 1% by weight of component F.

Equally suitable combinations comprise 50 to 70% by weight of component A, 10 to 15% by weight of component B and 20 to 25% by weight of component C, 2 to 5% by weight of component D, 0.5 to 1% by weight of component E and 0 to 1% by weight of component F.

And combinations comprising 50 to 70% by weight of component A, 10 to 15% by weight of component B, 20 to 25% by weight of component C, 2 to 5% by weight of component D, 0.5 to 1% by weight of component E and 0.5 to 1% by weight of component F.

The invention also relates to a flame-retardant polymer molding composition comprising the inventive flame retardant-stabilizer combination.

The polymer preferably comprises thermoplastic polymers of the HI (high-impact) polystyrene, polyphenylene ether, polyamide, polyester or polycarbonate type, and blends or polymer blends of the ABS (acrylonitrile-butadiene-styrene) or PC/ABS (polycarbonate/acrylonitrile-butadiene-styrene) or PPE/HIPS (polyphenylene ether/HI polystyrene) polymer type.

The polymer more preferably comprises polyamides, polyesters and PPE/HIPS blends.

The polymers are preferably polyurethanes which derive from polyethers, polyesters and polybutadienes having both terminal hydroxyl groups and aliphatic or aromatic polyisocyanates.

The polymers preferably comprise unsaturated polyester resins which derive from copolyesters of saturated and unsaturated dicarboxylic acids with polyhydric alcohols, and vinyl compounds as crosslinking agents.

The polymers preferably comprise crosslinkable acrylic resins which derive from substituted acrylic esters, for example from epoxy acrylates, urethane acrylates or polyester acrylates.

The polymers are preferably alkyd resins, polyester resins and acrylate resins which have been crosslinked with melamine resins, urea resins, isocyanates, isocyanurates, poiyisocyanates and/or epoxy resins.

The polymers are preferably crosslinked epoxy resins which derive from aliphatic, cycloaliphatic, heterocyclic or aromatic glycidyl compounds, for example products of bisphenol A diglycidyl ethers, bisphenol F diglycidyl ethers, which are crosslinked by means of customary hardeners, for example anhydrides or amines, with or without accelerators.

Preference is given to using the flame retardant-stabilizer combination in the polymer molding composition in a total amount of 2 to 50% by weight, based on the polymer molding composition (corresponding to 50 to 98% by weight of polymer molding composition).

Particular preference is given to using the flame retardant-stabilizer combination in the polymer molding composition in a total amount of 10 to 30% by weight, based on the polymer molding composition (corresponding to 70 to 90% by weight of polymer molding composition).

The invention finally also relates to polymer moldings, films, filaments and fibers comprising the inventive flame retardant-stabilizer combination.

The polymer moldings, films, filaments and fibers comprise HI (high-impact) polystyrene, polyphenylene ethers, polyamides, polyesters, polycarbonates and blends or polymer blends of the ABS (acrylonitrile-butadiene-styrene) or PC/ABS (polycarbonate/acrylonitrile-butadiene-styrene), polyamide, polyester and/or ABS type.

The polymer moldings, films, filaments and fibers preferably comprise the inventive flame retardant-stabilizer combination in a total amount of 2 to 50% by weight, based on the polymer content (corresponding to 50 to 98% by weight of polymer).

The polymer moldings, films, filaments and fibers more preferably comprise the inventive flame retardant-stabilizer combination in a total amount of 10 to 30% by weight, based on the polymer content (corresponding to 70 to 90% by weight of polymer).

In a particular embodiment, the polymer moldings, films, filaments and fibers comprise 2 to 30% by weight of the flame retardant-stabilizer combination comprising 50 to 80% by weight of component A, 20 to 50% by weight of component B, 2 to 20% by weight of component C, 0 to 3% by weight of component D, 0 to 3% by weight of component E and 0.1 to 3% by weight of component F.

The aforementioned additives can be introduced into the polymer in a wide variety of different process steps. For instance, it is possible in the case of polyamides or polyesters, at the start or at the end of the polymerization/polycondensation or in a subsequent compounding operation, to mix the additives into the polymer melt. In addition, there are processing operations in which the additives are not added until a later stage. This is practiced especially in the case of use of pigment or additive masterbatches. There is also the possibility of applying additives, particularly in pulverulent form, to the polymer pellets, which may be warm as a result of the drying operation, by drum application.

The flame retardant-stabilizer combination is preferably in the form of pellets, flakes, fine grains, powder and/or micronizate.

The flame retardant-stabilizer combination is preferably in the form of a physical mixture of the solids, of a melt mixture, of a compactate, of an extrudate, or in the form of a masterbatch.

Suitable polyesters derive from dicarboxylic acids and esters thereof and diols and/or from hydroxycarboxylic acids or the corresponding lactones. Particular preference is given to using terephthalic acid and ethylene glycol, propane-1,3-diol and butane-1,3-diol.

Suitable polyesters include polyethylene terephthalate, poiybutylene terephthalate (Celanex® 2500, Celanex® 2002, from Celanese; Ultradur®, from BASF), poly-1,4-dimethylolcyclohexane terephthalate, polyhydroxybenzoates, and block polyether esters which derive from polyethers with hydroxyl end groups; and also polyesters modified with polycarbonates or MBS.

The flame-retardant polyester molding compositions prepared in accordance with the invention are preferably used in polyester moldings.

Preferred polyester moldings are filaments, fibers, films and moldings which comprise mainly terephthalic acid as the dicarboxylic acid component and mainly ethylene glycol as the diol component.

Preferably, the resulting phosphorus content in filaments and fibers produced from flame-retardant polyesters is 0.1 to 18%, preferably 0.5 to 15%, and, in the case of films, 0.2 to 15%, preferably 0.9 to 12% by weight.

Suitable polystyrenes are polystyrene, poly(p-methylstyrene) and/or poly (alpha-methylstyrene).

The suitable polystyrenes are preferably copolymers of styrene or alpha-methylstyrene with dienes or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; highly impact-resistant mixtures of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

The suitable polystyrenes are preferably also graft copolymers of styrene or alpha-methylstyrene,for example styrene onto polybutadiene, styrene onto polybutadiene-styrene or polybutadiene-acrylonitrile copolymers, styrene and acrylonitrile (or methacrylonitrile) onto polybutadiene; styrene, acrylonitrile and methyl methacrylate onto polybutadiene; styrene and maleic anhydride onto polybutadiene; styrene, acrylonitrile and maleic anhydride or maleimide onto polybutadiene; styrene and maleimide onto polybutadiene, styrene and alkyl acrylates or alkyl methacrylates onto polybutadiene, styrene and acrylonitrile onto ethylene-propylene-diene terpolymers, styrene and acrylonitrile onto polyalkyl acrylates or polyalkyl methacrylates, styrene and acrylonitrile onto acrylate-butadiene copolymers, and mixtures thereof, as known, for example, as what are called ABS, MBS, ASA or AES polymers.

The polymers are preferably polyamides and copolyamides which derive from diamines and dicarboxylic acids and/or from aminocarboxylic acids or the corresponding lactams, such as nylon-2,12, nylon-4, nylon-4,6, nylon-6, nylon-6,6, nylon-6,9, nylon-6,10, nylon-6,12, nylon-6,66, nylon-7,7, nylon-8,8, nylon-9,9, nylon-10,9, nylon-10,10, nylon-11, nylon-12, etc. These are known, for example, by the trade names Nylon®, from DuPont, Ultramid®, from BASF, Akulon® K122, from DSM, ®Zytel 7301, from DuPont; Durethan® B 29, from Bayer and Grillamid®, from Ems Chemie.

Also suitable are aromatic polyamides proceeding from m-xylene, diamine and adipic acid; polyamides prepared from hexamethylenediamine and iso- and/or terephthalic acid and optionally an elastomer as a modifier, for example poly-2,4,4-trimethylhexamethyleneterephthalamide or poly-m-phenyleneisophthalamide, block copolymers of the aforementioned polyamides with polyolefins, olefin copolymers, ionomers or chemically bound or grafted elastomers, or with polyethers, for example with polyethylene glycol, polypropylene glycol or polytetramethylene glycol. In addition, EPDM- or ABS-modified polyamides or copolyamides; and polyamides condensed during processing ("RIM polyamide systems").

The invention finally also relates to a process for producing flame-retardant polymer moldings, wherein inventive flame-retardant polymer molding compositions are processed by injection molding (for example injection molding machine of the Aarburg Allrounder type) and pressing, foam injection molding, internal gas pressure injection molding, blow molding, film casting, calendering, laminating or coating at elevated temperatures to give the flame-retardant polymer molding.

Preferably, the thermoset polymers comprise unsaturated polyester resins (UP resins) which derive from copolyesters of saturated and unsaturated dicarboxylic acids or anhydrides thereof with polyhydric alcohols, and vinyl compounds as crosslinking agents. UP resins are cured by free-radical polymerization with initiators (e.g. peroxides) and accelerators.

Preferred unsaturated dicarboxylic acids and derivatives for preparation of the polyester resins are maleic anhydride and fumaric acid.

Preferred saturated dicarboxylic acids are phthalic acid, isophthalic acid, terephthalic acid, tetrahydrophthalic acid, adipic acid.

Preferred diols are 1,2-propanediol, ethylene glycol, diethylene glycol and neopentyl glycol, neopentyl glycol, ethoxylated or propoxylated bisphenol A.

A preferred vinyl compound for crosslinking is styrene.

Preferred curative systems are peroxides and metal coinitiators, for example hydroperoxides and cobalt octanoate and/ or benzoyl peroxide and aromatic amines and/or UV light and photosensitizers, e.g. benzoin ethers.

Preferred hydroperoxides are di-tert-butyl peroxide, tert-butyl peroctoate, tert-butyl perpivalate, tert-butyl per-2-ethylhexanoate, tert-butyl permaleate, tert-butyl perisobutyrate, benzoyl peroxide, diacetyl peroxide, succinyl peroxide, p-chlorobenzoyl peroxide and dicyclohexyl peroxodicarbonate.

Preferably, initiators are used in amounts of 0.1 to 20% by weight, preferably 0.2 to 15% by weight, based on the mass of all comonomers.

Preferred metal coinitiators are compounds of cobalt, manganese, iron, vanadium, nickel or lead. Preferably, metal coinitiators are used in amounts of 0.05 to 1% by weight, based on the mass of all comonomers.

Preferred aromatic amines are dimethylaniline, dimethyl-p-toluene, diethylaniline and phenyldiethanolamines.

In one process for producing flame-retardant thermoset compositions, a thermoset resin is mixed with an inventive flame retardant-stabilizer combination as claimed in at least one of claims 1 to 13 and optionally further flame retardants, synergists, stabilizers, additives and fillers or reinforcers, and the resulting mixture is wet pressed at pressures of 3 to 10 bar and temperatures of 20 to 60° C. (cold pressing).

In a further process for producing flame-retardant thermoset compositions, a thermoset resin is mixed with an inventive flame retardant-stabilizer combination as claimed in at least one of claims 1 to 13 and optionally further flame retardants, synergists, stabilizers, additives and fillers or reinforcers, and the resulting mixture is wet pressed at pressures of 3 to 10 bar and temperatures of 80 to 150° C. (warm or hot pressing).

Preferably, the polymers are crosslinked epoxy resins which derive from aliphatic, cycloaliphatic, heterocyclic or aromatic glycidyi compounds, for example from bisphenol A diglycidyl ethers and bisphenol F diglycidyl ethers, which are crosslinked by means of customary hardeners and/or accelerators.

Suitable glycidyl compounds are bisphenol A diglycidyl esters, bisphenol F diglycidyl esters, polyglycidyl esters of phenol formaldehyde resins and cresol-formaldehyde resins, polyglycidyl esters of phthalic acid, isophthalic acid and terephthalic acid, and of trimellitic acid, N-glycidyl compounds of aromatic amines and heterocyclic nitrogen bases, and di- and polygiycidyi compounds of polyhydric aliphatic alcohols.

Suitable hardeners are aliphatic, cycloaliphatic, aromatic and heterocyclic amines or polyamines, such as ethylenediamine, diethylenetriamine triethylenetetramine, propane-1,3-diamine, hexamethylenediamine, aminoethylpiperazine, isophoronediamine, polyamidoamine, diaminodiphenylmethane, diaminodiphenyl ether, diaminodiphenyl sulfone, aniline-formaldehyde resins, 2,2,4-trimethylhexane-1,6-diamine, m-xylylenediamine, bis(4-aminocyclohexyl)methane, 2,2-bis(4-aminocyclohexyl)propane, 3-aminomethyl-3,5,5-trimethylcyclohexylamine(isophoronediamine), polyamidoamines, cyanoguanidine and dicyandiamide, and likewise polybasic acids or anhydrides thereof, for example phthalic anhydride, maleic anhydride, tetrahydrophthalic anhydride, methyltetrahydrophthalic anhydride, hexahydrophthalic anhydride and methylhexahydrophthalic anhydride, and also phenols, for example phenol-novolac resin, cresol-novolac resin, dicyclopentadiene-phenol adduct resin, phenol aralkyl resin, cresolaralkyl resin, naphtholaralkyl resin, biphenol-modified phenolaralkyl resin, phenoktrimethylolmethane resin, tetraphenylolethane resin, naphthol-novolac resin, naphthol-phenol cocondensate resin, naphthol-cresol cocondensate resin, biphenol-modified phenol resin and aminotriazine-modified phenol resin. All hardeners can be used alone or in combination with one another.

Suitable catalysts or accelerators for the crosslinking in the polymerization are tertiary amines, benzyldimethylamine, N-alkylpyridines, imidazole, 1-methylimidazole, 2-methylimidazole, 2-ethyl-4-methylimidazole, 2-ethyl-4-methylimidazole, 2-phenylimidazole, 2-heptadecylimidazole, metal salts of organic acids, Lewis acids and amine complex salts.

The formulation of the invention may also comprise other additives which are commonly used in epoxy resin formulations, such as pigments, dyes and stabilizers.

Epoxy resins are suitable for potting of electrical or electronic components and for saturation and impregnation processes. in electrical engineering, epoxy resins are predominantly rendered flame-retardant and used for printed circuit boards and insulators.

Preferably, the polymers are crosslinked polymers which derive from aldehydes on the one hand, and phenols, urea or melamine on the other hand, such as phenol-formaldehyde, urea-formaldehyde and melamine-formaldehyde resins. The polymers preferably comprise crosslinkable acrylic resins which derive from substituted acrylic esters, for example from epoxy acrylates, urethane acrylates or polyester acrylates.

Preferably, the polymers are alkyd resins, polyester resins and acrylate resins which have been crosslinked with melamine resins, urea resins, isocyanates, isocyanurates, polyisocyanates or epoxy resins.

Preferred polyols are alkene oxide adducts of ethylene glycol, 1,2-propanediol, bisphenol A, trimethylolpropane, glycerol, pentaerythritol, sorbitol, sugars, degraded starch, ethylenediamine, diaminotoluene and/or aniline, which serve as initiators. The preferred alkoxylating agents preferably contain 2 to 4 carbon atoms, particular preference being given to ethylene oxide and propylene oxide.

Preferred polyester polyols are obtained by polycondensation of a polyalcohol such as ethylene glycol, diethylene glycol, propylene glycol, 1,4-butanediol, 1,5-pentanediol, methylpentanediol, 1,6-hexanediol, trimethylolpropane, glycerol, pentaerythritol, diglycerol, glucose and/or sorbitol, with a dibasic acid such as oxalic acid, maionic acid, succinic acid, tartaric acid, adipic acid, sebacic acid, maleic acid, fumaric acid, phthalic acid and/or terephthalic acid. These polyester polyols can be used alone or in combination.

Suitable polyisocyanates are aromatic, alicyclic or aliphatic polyisocyanates having not fewer than two isocyanate groups and mixtures thereof. Preference is given to aromatic polyisocyanates such as tolyl diisocyanate, methylene diphenyl diisocyanate, naphthylene diisocyanate, xylylene diisocyanate, tris(4-isocyanatophenyl)methane and polymethylenepolyphenyiene diisocyanates; alicyclic polyisocyanates such as methylenediphenyl diisocyanate, tolyl diisocyanate; aliphatic polyisocyanates and hexamethylene diisocyanate, isophorone diisocyanate, dimeryl diisocyanate, 1,1-methylenebis (4-isocyanatocyclohexane)-4,4'-diisocyanatodicyclohexylmethane isomer mixture, 1,4-cyclohexyl diisocyanate, Desmodur® products (Bayer) and lysine diisocyanate and mixtures thereof.

Suitable polyisocyanates are modified products which are obtained by reaction of polyisocyanate with polyol, urea, carbodiimide and/or biuret.

Preferably, the weight ratio of the polyisocyanate to polyol is 170 to 70 parts by weight, preferably 130 to 80 parts by weight, based on 100 parts by weight of the polyol.

Preferably, the weight ratio of the catalyst is 0.1 to 4 parts by weight, more preferably 1 to 2 parts by weight, based on 100 parts by weight of the polyol.

Preferred blowing agents for polyurethanes are water, hydrocarbons, hydrochlorofluorocarbon, hydrofluorocarbon etc. The amount of the blowing agent for polyurethanes is 0.1 to 1.8 parts by weight, preferably 0.3 to 1.6 parts by weight and especially 0.8 to 1.6 parts by weight, based on 100 parts by weight of the polyol.

Preference is given to using the mixture in a molding composition of a polyamide or of a polyester. Suitable polyamides are described, for example, in DE-A-199 20 276.

The polyamides are preferably those of the amino acid type and/or of the diamine-dicarboxylic acid type. The polyamides are preferably nylon-6 and/or nylon-6,6.

The polyesters are preferably polyethylene terephthalate or polybutylene terephthalate.

The polyamides and polyesters are preferably unmodified, colored, filled, unfilled, reinforced, unreinforced, or else differently modified.

EXAMPLES

1. Components Used
Commercial Polymers (Pellets):
nylon-6,6 (N 6,6-GR): Ultramid® A27 (from BASF AG, Germany) polybutylene terephthalate (PBT) Ultradur® B4500 (from BASF AG, Germany)
Glass Fibers:
Vetrotex® 983 EC 10 4.5 mm (from Saint-Gobain-Vetrotex, Germany)
Vetrotex® 952 EC 10 4.5 mm (from Saint-Gobain-Vetrotex, Germany)
Flame Retardant (Component A):
aluminum salt of diethylphosphinic acid, referred to hereinafter as DEPAL
Flame Retardant (Component B):
aluminum salt of ethylphosphinic acid, referred to hereinafter as EPAL
Synergist (Component C):
melamine polyphosphate (referred to as MPP), Melapur® 200 (from Ciba SC, Switzerland)
melamine cyanurate (referred to as MC), Melapur® MC50 (from Ciba SC, Switzerland)
melem, Delacal® 420, Delacal® 360 (from Delamin Ltd, UK)
Component D:
zinc borate, Firebrake® ZB and Firebrake® 500, from Borax, USA dihydrotalcite, DHT 4A, from Kyowa Chemicals, Japan
Phosphonites (Component E):
Sandostab® P-EPQ, from Clariant, Germany
Wax Components (Component F):
Licomont® CaV 102, Clariant, Germany (calcium salt of montan wax acid)
Licowax® E, from Clariant, Germany (ester of montan wax acid)

2. Production, Processing and Testing of Flame-retardant polymer Molding Compositions Components A, B and C, and optionally E, D and/or F, were mixed in the ratio specified in the table and incorporated via the side intake of a twin-screw extruder (Leistritz ZSE 27/44D) into N 6,6 at temperatures of 260 to 310° C., and into PBT at 250 to 275° C. The glass fibers were added via a second side intake. The homogenized polymer strand was drawn off, cooled in a water bath and then pelletized.

After sufficient drying, the molding compositions were processed to test specimens on an injection molding machine (Arburg 320 C Allrounder) at melt temperatures of 250 to 300° C., and tested and classified for flame retardancy using the UL 94 test (Underwriter Laboratories).

The UL 94 fire classifications are as follows:
V-0: afterflame time never longer than 10 sec, total of afterflame times for 10 flame applications not more than 50 sec, no flaming drops, no complete consumption of the specimen, afterglow time for specimens never longer than 30 sec after end of flame application
V-1: afterflame time never longer than 30 sec after end of flame application, total of afterflame times for 10 flame applications not more than 250 sec, afterglow time for specimens never longer than 60 sec after end of flame application, other criteria as for V-0
V-2: cotton indicator ignited by flaming drops, other criteria as for V-1 not classifiable (nci): does not comply with fire classification V-2.

The flowability of the molding compositions was determined by finding the melt volume flow rate (MVR) at 275° C./2.16 kg. A sharp rise in the MVR value indicates polymer degradation.

All tests in the respective series, unless stated otherwise, were performed under identical conditions (temperature programs, screw geometries, injection molding parameters, etc.) due to comparability.

Formulations 1 to 3 are comparative examples in which a flame retardant combination based on the aluminum salt of diethylphosphinic acid (DEPAL) and the nitrogen-containing synergist melamine polyphosphate (MPP) and the metal oxide or borate alone were used.

The results in which the flame retardant-stabilizer mixture according to the invention was used are listed in examples 4 to 6. All amounts are reported as % by weight and are based on the polymer molding composition including the flame retardant combination and additives.

TABLE 1

N 6,6 GF 30 test results. Examples 1 to 3 are comparative examples, examples 4 to 6 inventive flame retardant-stabilizer mixture

|  | 1 | 2 | 3 | 4 | 5 | 6 |
|---|---|---|---|---|---|---|
| nylon-6,6 | 49.55 | 49.55 | 49.55 | 49.55 | 49.55 | 49.55 |
| 983 glass fibers | 30 | 30 | 30 | 30 | 30 | 30 |
| A: DEPAL | 13 | 12 | 12 | 12 | 12 | 12 |
| B: EPAL |  |  |  | 5 | 4 | 4 |
| C: MPP | 7 | 7 | 7 | 3 | 3 | 3 |
| D1: zinc borate |  | 1 |  |  | 1 |  |
| D2: DHT4A |  |  | 1 | 1 |  | 1 |
| E: CaV 102 | 0.25 | 0.25 | 0.25 | 0.25 | 0.25 | 0.25 |
| F: P-EPQ | 0.20 | 0.20 | 0.20 | 0.20 | 0.20 | 0.20 |
| UL 94 0.8 mm | V-0 | V-0 | V-1 | V-0 | V-0 | V-0 |
| MVR 275° C./2.16 kg | 19 | 12 | 14 | 5 | 3 | 4 |
| Exudation* | severe | marked | marked | low | none | low |
| Color | gray | white | white | white | white | white |
| Impact resistance [kJ/m$^2$] | 61 | 61 | 55 | 61 | 63 | 66 |
| Notched impact resistance [kJ/m$^2$] | 15 | 16 | 12 | 9.4 | 15 | 11 |

*14 days, 100% humidity, 70° C.

It is clear from the examples that the inventive additions (mixture of the DEPAL, EPAL, MPP and borate or hydrotalcite components and components E and F) clearly improve the processibility of the polymers and the properties of the injection moldings, without impairing flame retardancy.

The incorporation of the DEPAL and MPP flame retardants into N 6,6 does lead to UL 94 V-0, but also to gray discoloration of the molding compositions, exudation and high melt indices (example 1). The addition of zinc borate or hydrotalcite can prevent the gray discoloration, and exudation declines markedly (examples 2 and 3).

If an inventive flame retardant-stabilizer combination of DEPAL, EPAL, nitrogen synergist, borate or hydrotalcite, lubricant and stabilizer (examples 4 to 6) is used, the result is not only flame retardancy but also no discoloration, no exudation, low melt indices and good mechanical properties. The low melt index (MVR) shows that there is no polymer degradation.

TABLE 2

PBT GF 25 test results. Examples 7 to 9 are comparative examples; examples 10 to 12 contain inventive flame retardant-stabilizer mixture

|  | 7 | 8 | 8 | 10 | 11 | 12 |
|---|---|---|---|---|---|---|
| PBT | 49.55 | 49.55 | 49.55 | 49.55 | 49.55 | 49.55 |
| 952 glass fibers | 25 | 25 | 25 | 25 | 25 | 25 |
| A: DEPAL | 13.3 | 12 | 12 | 12 | 12 | 12 |
| B: EPAL |  |  |  | 5 | 4 | 4 |
| C1: MC | 7 | 7 | 7 | 3 | 3 | 3 |
| C2: MPP |  | 1 |  |  | 1 |  |
| C3: melem |  |  | 1 | 1 |  | 1 |
| E: Licowax E | 0.25 | 0.25 | 0.25 | 0.25 | 0.25 | 0.25 |
| F: P-EPQ | 0.20 | 0.20 | 0.20 | 0.20 | 0.20 | 0.20 |
| UL 94 0.8 mm | V-1 | V-1 | V-1 | V-0 | V-0 | V-0 |
| Solution viscosity SV* | 1185 | 1201 | 1179 | 1375 | 1364 | 1338 |
| Elongation at break [%] | 2.1 | 2.2 | 2.1 | 2.4 | 2.4 | 2.4 |
| Impact resistance [kJ/m²] | 40 | 41 | 39 | 49 | 48 | 47 |
| Notched impact resistance [kJ/m²] | 6.3 | 6.6 | 6.2 | 7.8 | 7.5 | 7.6 |

*in dichloroacetic acid, pure PBT (uncompounded) gives 1450

The incorporation of DEPAL and MC and the further additives (examples 7 to 9) leads only to a V-1 classification and distinct polymer degradation, evident from the low solution viscosities. The mechanical values are also low compared to non-flame-retardant PBT. The inventive combination of DEPAL with EPAL and the further additives virtually completely suppresses polymer degradation; fire class V-0 is attained and the mechanical values are improved.

The invention claimed is:

1. A flame retardant-stabilizer combination for thermoplastic and thermoset polymers, comprising as component A 25 to 97.7% by weight of a dialkylphosphinic salt of the formula (I), a diphosphinic salt of the formula (II), polymers thereof or a combination thereof

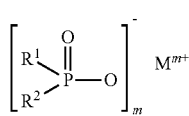 (I)

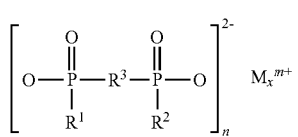 (II)

wherein $R^1$, $R^2$ are ethyl;

$R^3$ is linear or branched $C_1$-$C_{10}$-alkylene, $C_6$-$C_{10}$-arylene, $C_7$-$C_{20}$-alkylarylene or $C_7$-$C_{20}$-arylalkylene;

M is Mg, Ca, Al, Sb, Sn, Ge, Ti, Zn, Fe, Zr, Ce, Bi, Sr, Mn, Li, Na, K, a protonated nitrogen base or a combination thereof;

m is 1 to 4;

n is 1 to 4;

x is 1 to 4, as component B 2 to 45% by weight of a monoalkylphosphinic salt of the formula (III)

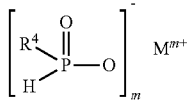

wherein $R^4$ is ethyl;

M is Mg, Ca, Al, Sb, Sn, Ge, Ti, Zn, Fe, Zr, Ce, Bi, Sr, Mn, Li, Na, K, a protonated nitrogen base or a combination thereof, as component C 0.3 to 30% by weight of melem, melam, melon, dimelamine pyrophosphate, melamine polyphosphate, melem polyphosphate, melam polyphosphate, melon polyphosphate, mixed poly salts thereof or a combination thereof, as component D 0 to 10% by weight of a zinc salt or of a basic or amphoteric oxide, hydroxide, carbonate, silicate, borate, stannate, mixed oxide-hydroxide, oxide-hydroxide-carbonate, hydroxide-silicate or hydroxide-borate or a combination thereof, as component E 0 to 3% by weight of a phosphonite or of a mixture of a phosphonite and a phosphite, and as component F 0 to 3% by weight of an ester or salt of long-chain aliphatic carboxylic acids having a chain length of $C_{14}$ to $C_{40}$, where the sum of the components is always 100% by weight.

2. The flame retardant-stabilizer combination as claimed in claim 1, wherein $R^1$, $R^2$ are the same or different and are each methyl, ethyl. n-propyl, isopropyl, n-butyl, tert-butyl, n-pentyl, phenyl or a combination thereof.

3. The flame retardant-stabilizer combination as claimed in claim 1, wherein $R^3$ is methylene, ethylene, n-propylene, isopropylene, n-butylene, tert-butylene, n-pentylene, n-octylene or n-dodecylene; phenylene or naphthylene; methylphenylene, ethylphenylene, tert-butylphenylene, methylnaphthylene, ethylnaphthyle or tert-butylnaphthylene; phenylmethylene, phenylethylene, phenylpropylene or phenylbutylene.

4. The flame retardant-stabilizer combination as claimed in claim 1, comprising 25 to 97.4% by weight of component A, 2 to 35% by weight of component B, 0.3 to 27% by weight of component C, 0.1 to 7% by weight of component D, 0.1 to 3% by weight of component E and 0.1 to 3% by weight of component F.

5. The flame retardant-stabilizer combination as claimed in claim 1, comprising
   50 to 69.7% by weight of component A,
   10 to 15% by weight of component B,
   20 to 25% by weight of component C,
   0.1 to 5% by weight of component D,
   0.1 to 3% by weight of component E and
   0.1 to 2% by weight of component F.

6. The flame retardant-stabilizer combination as claimed in claim 1, wherein component C comprises condensation products of melamine, reaction products of melamine with polyphosphoric acid, reaction products of condensation products of melamine with polyphosphoric acid or a combination thereof.

7. The flame retardant-stabilizer combination as claimed in claim 1, wherein component C comprises nitrogen-containing phosphates of the formulae $(NH_4)_y H_{3-y} PO_4$ and $(NH_4 PO_3)_z$, where y is 1 to 3 and z is 1 to 10 000.

8. The flame retardant-stabilizer combination as claimed in claim 7, wherein component C comprises ammonium hydrogenphosphate, ammonium dihydrogenphosphate, ammonium polyphosphate or a combination thereof.

9. The flame retardant-stabilizer combination as claimed in claim 1, wherein component C comprises benzoguananine, tris(hydroxyethyl) isocyanurate, allantoin, glycoluril, melamine, melamine cyanurate, dicyandiamide, guanidine or a combination thereof.

10. The flame retardant-stabilizer combination as claimed in claim 1, wherein component D comprises magnesium oxide, calcium oxide, aluminum oxide, zinc oxide, manganese oxide, tin oxide, aluminum hydroxide, boehmite, dihydrotalcite, hydrocalumite, magnesium hydroxide, calcium hydroxide, zinc hydroxide, tin oxide hydrate, manganese hydroxide, zinc borate, basic zinc silicate, zinc stannate or a combination thereof.

11. The flame retardant-stabilizer combination as claimed in claim 1, wherein the phosphonites comprise those of the structure

$$R\text{—}[P(OR_1)_2]_m \quad (IV)$$

wherein
R is a mono- or polyvalent aliphatic, aromatic or heteroaromatic organic radical and
$R_1$ is a compound of the structure (V)

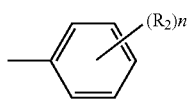

(V)

or the two $R_1$ radicals form a bridging group of the structure (VI)

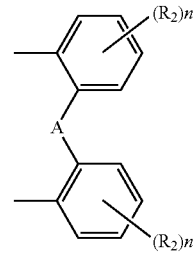

(VI)

wherein
A is a direct bond, O, S, linear or branched $C_{1-18}$-alkylene or, linear or branched $C_{1-18}$-alkylidene,
wherein
$R_2$ is independently linear or branched $C_{1-12}$-alkyl, $C_{1-12}$-alkoxy or $C_{5-12}$-cycloalkyl and
n is 0 to 5 and
m is 1 to 4.

12. The flame retardant-stabilizer combination as claimed in claim 1, wherein component F comprises alkali metal, alkaline earth metal, aluminum or zinc salts of long-chain fatty acids having 14 to 40 carbon atoms or reaction products of long-chain fatty acids having 14 to 40 carbon atoms with polyhydric alcohols or a combination thereof.

13. A flame-retardant polymer molding composition comprising a flame retardant-stabilizer combination as claimed in claim 1, wherein the polymer comprises thermoplastic polymers selected from the group consisting of high impact polystyrene, polyphenylene ether, polyamide, polyester or polycarbonate type, and blends or polymer blends of the acrylonitrile-butadiene-styrene or polycarbonate/acrylonitrile-butadiene-styrene or polyphenylene ether/high impact polystyrene polymer type.

14. The flame-retardant polymer molding composition as claimed in claim 13, comprising 50 to 98% by weight of polymer molding composition and 2 to 50% by weight of the flame retardant-stabilizer combination as claimed in claim 1.

15. A polymer molding, film, filament or fiber comprising a flame retardant-stabilizer combination as claimed in claim 1, wherein the polymer comprises high impact polystyrene, polyphenylene ethers, polyamides, polyesters, polycarbonates and blends or polymer blends of the acrylonitrile-butadiene-styrene or polycarbonate/acrylonitrile-butadiene-styrene, polyamide, polyester, acrylonitrile-butadiene-styrene or a combination thereof, and which comprises 50 to 98% by weight of polymer molding, film, filament, fiber or a combination thereof and 2 to 50% by weight of the flame retardant-stabilizer combination.

16. The flame retardant-stabilizer combination as claimed in claim 1, wherein component F comprises ethylene glycol, glycerol, trimethylolpropane, pentaerythritol or a combination thereof.

* * * * *